United States Patent
Oura et al.

(10) Patent No.: US 7,352,798 B2
(45) Date of Patent: Apr. 1, 2008

(54) CDMA RECEPTION DEVICE

(75) Inventors: Satoshi Oura, Tokyo (JP); Akio Aoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 557 days.

(21) Appl. No.: 10/517,371

(22) PCT Filed: Jun. 6, 2003

(86) PCT No.: PCT/JP03/07186

§ 371 (c)(1),
(2), (4) Date: Dec. 10, 2004

(87) PCT Pub. No.: WO03/107553

PCT Pub. Date: Dec. 24, 2003

(65) Prior Publication Data

US 2005/0254607 A1    Nov. 17, 2005

(30) Foreign Application Priority Data

Jun. 12, 2002    (JP)    ............................ 2002-170832

(51) Int. Cl.
*H04L 27/06*    (2006.01)
(52) U.S. Cl. ..................................... 375/147; 375/343
(58) Field of Classification Search ........ 375/140–153, 375/343
See application file for complete search history.

(56) References Cited

U.S. PATENT DOCUMENTS 6,400,780 B1 *    6/2002    Rashid-Farrokhi et al. . 375/347
7,106,785 B2 *    9/2006    Yoshida ....................... 375/148
2002/0067761 A1 *    6/2002    Kong et al. ................. 375/148
2003/0223489 A1 *    12/2003    Smee et al. ................. 375/233

FOREIGN PATENT DOCUMENTS

JP    2000-59334 A    2/2000
WO    WO 97/39545 A1    10/1997

OTHER PUBLICATIONS

International Search Report, Jun. 17, 2003.

* cited by examiner

*Primary Examiner*—Chieh M. Fan
*Assistant Examiner*—Jason M. Perilla
(74) *Attorney, Agent, or Firm*—Sughrue Mion, PLLC (57) ABSTRACT

A switching circuit (112) is controlled by an in-slot interface-noise-power-control output circuit (115) to output an in-slot interface noise power (107-*n*) to a past-slot interference-noise-power memory (110), if there is no estimated value for an interference noise power of finger n of one slot before. If the interference noise power of the one slot before is not estimated and yet there exists an interference noise power which has been once estimated, the past-slot interference-noise-power memory (110) stores therein an interference noise power in a last slot which has been valid. An inter-slot averaging processing is performed between the interference noise power (111-*n*) from the past-slot interference-noise-power memory (110) and an estimated value (107-*n*) for the interference noise power in the current slot.

9 Claims, 7 Drawing Sheets

| SLOT NUMBER | ESTIMATED VALUE FOR IN-SLOT INTERFERENCE NOISE POWER | FINGER STATE |
|---|---|---|
| SLOT M-3 | NO INTERFERENCE NOISE POWER | INVALID STATE |
| SLOT M-2 | NO INTERFERENCE NOISE POWER | |
| SLOT M-1 | NO INTERFERENCE NOISE POWER | |
| SLOT M | INTERFERENCE NOISE POWER=10 | VALID STATE |
| SLOT M+1 | INTERFERENCE NOISE POWER=12 | |
| SLOT M+2 | INTERFERENCE NOISE POWER=15 | |

FIG. 6

| SLOT NUMBER | INTERFERENCE NOISE POWER ESTIMATED VALUE | FINGER STATE |
|---|---|---|
| SLOT M-18 | INTERFERENCE NOISE POWER=11 | VALID STATE |
| SLOT M-17 | INTERFERENCE NOISE POWER=13 | |
| SLOT M-16 | NO INTERFERENCE NOISE POWER | INVALID STATE |
| ⋮ | ⋮ | |
| SLOT M-1 | NO INTERFERENCE NOISE POWER | |
| SLOT M | INTERFERENCE NOISE POWER=10 | VALID STATE |
| SLOT M+1 | INTERFERENCE NOISE POWER=12 | |
| SLOT M+2 | INTERFERENCE NOISE POWER=15 | |

FIG. 7

| SLOT NUMBER | ESTIMATED VALUE FOR INTERFERENCE NOISE POWER FOR FINGER NUMBER 1 | ESTIMATED VALUE FOR INTERFERENCE NOISE POWER FOR FINGER NUMBER 2 | ESTIMATED VALUE FOR INTERFERENCE NOISE POWER FOR FINGER NUMBER 3 |
|---|---|---|---|
| SLOT M−3 | INTERFERENCE NOISE POWER=12 | NO INTERFERENCE NOISE POWER | INTERFERENCE NOISE POWER=14 |
| SLOT M−2 | INTERFERENCE NOISE POWER=11 | NO INTERFERENCE NOISE POWER | INTERFERENCE NOISE POWER=13 |
| SLOT M−1 | INTERFERENCE NOISE POWER=11 | NO INTERFERENCE NOISE POWER | INTERFERENCE NOISE POWER=13 |
| SLOT M | INTERFERENCE NOISE POWER=10 | INTERFERENCE NOISE POWER=16 | INTERFERENCE NOISE POWER=12 |
| SLOT M+1 | INTERFERENCE NOISE POWER=12 | INTERFERENCE NOISE POWER=13 | INTERFERENCE NOISE POWER=14 |
| SLOT M+2 | INTERFERENCE NOISE POWER=15 | INTERFERENCE NOISE POWER=11 | INTERFERENCE NOISE POWER=10 |

FINGER STATE : INVALID STATE | VALID STATE

FIG. 8
PRIOR ART

CDMA RECEPTION DEVICE

TECHNICAL FIELD

The present invention relates to a CDMA receiving device, and more particularly to an estimation of interference noise power in the CDMA receiving device.

BACKGROUND ART

In a receiving device using a CDMA (code division multiple access) communication technique, a signal power of a received signal and an interference noise power for each finger are estimated, and the signal-power-to-interference-noise-power ratio (SINR) estimated thereby is used as a weighting factor for the maximum ratio combining of a demodulated signal The decrease of an SINR estimation accuracy deteriorates the accuracy of the maximum ratio combining and causes receiving characteristics to be deteriorated. Accordingly, it is necessary to improve the estimation accuracies of the signal power and the interference noise power.

The signal power and the interference noise power are normally estimated at a constant period, for example, at each increment of slot. Since a limited measurement interval, such as determined by a pilot signal, is generally used, the estimation accuracies of the signal power and the interference noise power in one slot are low. As a method for improving the estimation accuracies of the signal power and the interference noise power, there is a technique for averaging the estimated values each obtained in one slot among a plurality of slots.

However, as described in "a method for estimating high accuracy channel using a plurality of pilot blocks in DS-CDMA" written by Ando and Sawahashi (The Institute of Electronics, Information and Communication Engineers Technical Report, RCS96-72, 1996) (hereinafter referred to as a "document 1"), the improvement in the estimation accuracy by inter-slot averaging in the signal power is limited. The is because the fluctuation of the signal power with respect to time due to Rayleigh fading is significantly large to thereby lower the fading tracking capability, although the interference noise components included in the received signal are suppressed by the inter-slot averaging.

On the other hand, since the interference noise power is substantially constant with respect to time, an effect of improving the estimation accuracy of the interference noise power by the inter-slot averaging processing is large. The present invention is aimed at raising the SINR estimation accuracy by improving the estimation accuracy of the interference noise power and at preventing the characteristic deterioration of the CDMA receiving device.

Figure 8:
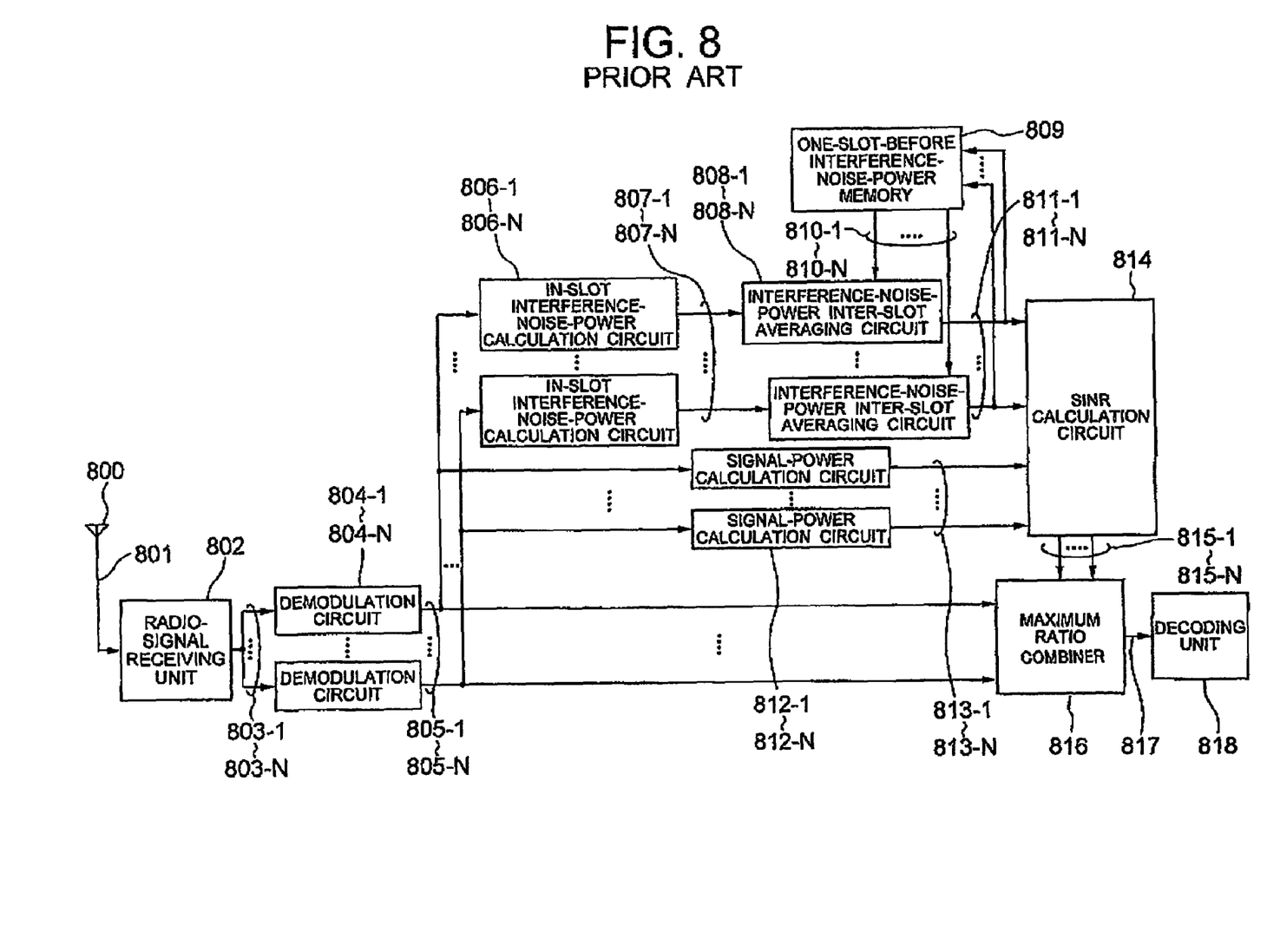
FIG. 8 is a block diagram of an example of a conventional receiving device.

FIG. 8 shows an example of the receiving device configured to averaging and estimating the interference noise power among a plurality of slots, such as described in "Examination of Method for Measuring SIR under Adaptive Transmission Power Control of DS-CDMA" written by Seio, Okumura and Doi (The Institute of Electronics, Information and Communication Engineers Society meeting B-330) (hereinafter referred to as a "document 2"). In FIG. 8, interference noise power estimated of one slot before is stored in a one-slot-before interference-noise-power memory 809. Interference noise power 807-$n$ calculated in the current slot and interference noise power 810-$n$ estimated one slot before are averaged by an interference-noise-power inter-slot averaging circuit 808-$n$.

However, if the interference noise power becomes valid, immediately after the receiving device establishes a radio link to a transmitting device, or after the finger once becomes an invalid state, the estimated value for the one-slot-before interference noise power does not exist. It is to be noted that the recitation "finger is valid" means the state that synchronization timing is detected for the finger. Similarly, the recitation "finger is invalid" means the state that the synchronization timing is not detected for the finger.

In FIG. 8, if there is no estimated value for the interference noise power of one slot before, the one-slot-before interference-noise-power memory 809 does not store therein the interference noise power. At this time, the interference-noise-power inter-slot averaging circuit 808-$n$ performs averaging processing between "0" and the current in-slot interference noise power 807-$n$. Therefore, if there is no estimated value for the interference noise power of one slot before, the interference-noise-power inter-slot averaging circuit 808-$n$ outputs an interference noise power 811-$n$ having a low estimation accuracy to an SINR calculation circuit 814. As a result, the estimation accuracy of the SINR is lowered, and the accuracy for the maximum ratio combining of the demodulated signals is deteriorated, thereby causing the characteristics of the CDMA receiving device to be deteriorated.

DISCLOSURE OF THE INVENTION

Accordingly, it is an object of the present invention to provide a CDMA receiving device which is capable of preventing deterioration of the receiving quality by accurately estimating interference noise power even if there is no estimated value for the interference noise power of one slot before.

The present invention provides a CDMA receiving device for estimating a signal power and an interference noise power of a received signal for each of fingers, and combining a demodulated signal by using a signal-power-to-interference-noise-power ratio estimated from these estimated signal power and interference noise power, characterized by interference-noise-power calculation means for estimating an interference noise power for each of fingers in a current slot; storage means for storing therein an estimated value for the interference noise power estimated for each of fingers in a last valid slot before a current slot; first averaging means for averaging an estimated value for the interference noise power in a current slot estimated by the interference-noise-power calculation means and the estimated value for the interference noise power stored in the storage means, first judging means for judging in which slot each finger becomes valid after a radio link is established, and first switching means for storing the interference noise power in a current slot estimated by the interference noise power calculation means into the storage means based on a judged result by the first judging means.

According to the DMA receiving device of the present invention, even if there is no estimated value for the interference noise power of one slot before, the deterioration of the receiving quality can be prevented by accurately estimating the interference noise power. The present invention realizes the CDMA (code division multiple access) receiving device which achieves the improvement in a communication quality by accurately estimating the interference noise power.

BEST MODE FOR CARRYING OUT THE INVENTION

Prior to the description of the embodiments of the present invention, the principle of the present invention will be described.

Figure 1:
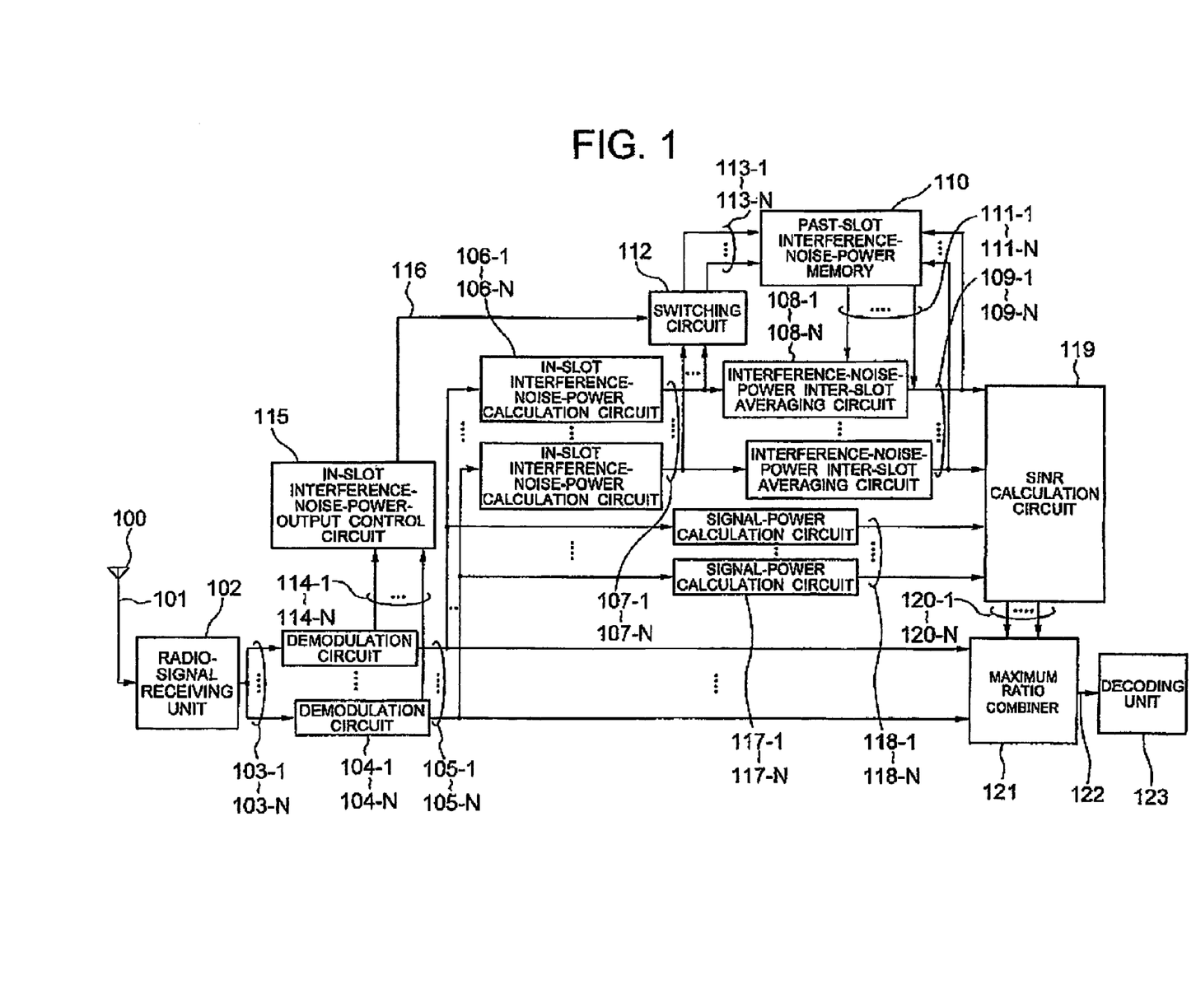
FIG. 1 is a block diagram of a CDMA receiving device according to a first embodiment of the present invention.

Refer to FIG. 1, a CDMA receiving device according to a first embodiment of the present invention is shown. If there is no estimated value for the interference noise power of finger n of one slot before immediately after a radio link is established, a switching circuit 112 is controlled by an in-slot interference-noise-power-output control circuit 115 so that an interference noise power 107-n in the current slot is output to a past-slot interference-noise-power memory 110.

If the interference noise power of one slot before is not estimated and yet there exists an interference noise power which has been once estimated in the past-slot, the past-slot interference-noise-power memory 110 stores therein the last interference noise power which has been valid.

Thus, an inter-slot averaging processing is performed between an interference noise power 111-n output from the past-slot interference-noise-power memory 110 and the estimated value for the current-slot interference noise power 107-n, and the interference noise power can be accurately estimated.

In the CDMA receiving device according to the above-mentioned embodiment, the SINR can be estimated, even in the state that there is no estimated value for the interference noise power of one slot before, by using the acurately estimated interference noise power. This is achieved by the addition of a configuration for storing the interference noise power in the past-slot interference-noise-power memory 110 for the purpose of inter-slot averaging. Accordingly, the deterioration of the receiving quality can be prevented.

The present invention will be fewer described below based on the embodiments of the present invention with reference to the accompanying drawings. In FIG. 1, a block for processing a radio band includes an antenna unit 100 for receiving a communication signal, and a radio-signal receiving unit 102 for frequency-converting a radio communication signal into a baseband signal.

A block for despread demodulation of the baseband signal includes N demodulation circuits 104-1 to 104-N. N is a natural number equal to the number of the fingers, and may be any number.

A block for estimating the interference noise power includes N in-slot interference-noise-power calculation circuits 106-1 to 106-N for estimating the interference noise power in the current slot, a past-slot interference-noise-power memory 110 for storing therein the interference noise power estimated in the past slot, and N interference-noise-power inter-slot averaging circuits 108-1 to 108-N for inter-slot averaging processing between the in-slot interference noise power in the current slot and the interference noise power of the past slot stored in the past-slot interference-noise-power memory 110, The past-slot interference-noise-power memory 110 overwrites the interference noise power, which is stored up to immediately before, with a new value each time the interference noise power is input. An in-slot interference-noise-power-output control circuit 115 generates an in-slot interference-noise-power-output control signal 116 based on finger-state notification signals 114-1 to 114-N output from the N demodulation circuits 104-1 to 104-N, and outputs the in-slot interference-noise-power-output control signal 116 to the switching circuit 112.

The switching circuit 112 switches the destinations of the current-slot interference noise powers 107-1 to 107-N to be input to the past-slot interference-noise-power memory 110, based on the in-slot interference-noise-power-output control signal 116.

The N signal-power calculation circuits 117-1 to 117-N estimate signal powers 118-1 to 118-N. An SINR calculation circuit 119 calculates N signal-power-to-interference-noise-power ratios (SINRs) 120-1 to 120-N based on interference noise powers 109-1 to 109-N and signal powers 118-1 to 118-N, and outputs the N signal-power-to-interference-noise-power ratios 120-1 to 120-N to a maximum ratio combiner 121. The maximum ratio combiner 121 uses the SINRs 120-1 to 120-N of the respective fingers to weight the demodulated signal to perform the maximum ratio combining, and outputs the combined signal to a decoding unit 123.

In operation, the frequency of a radio communication signal 101 received by the antenna unit 100 is converted into a baseband frequency band by the radio-signal receiving unit 102. Then, baseband signals 103-1 to 103-N, which are distributed to N corresponding to the number of the fingers, are respectively input to the demodulation circuits 104-1 to 104-N, for despread modulation therein.

As to a finger k (k is a natural number not larger than N) which is in an invalid state at this time, processing is not performed in the stages following the demodulation circuit 104-k. The demodulation circuits 104-1 to 104-N output the finger-state notification signals 114-1 to 114-N for notifying the states of the respective fingers to the in-slot interference-noise-power-output control circuit 115.

The demodulated signals 105-1 to 105-N generated for the respective fingers are distributed, and are respectively input to the in-slot interference-noise-power calculation circuits 106-1 to 106-N, the signal-power calculation circuits 117-1 to 117-N and the maximum ratio combiner 121. The interference noise power and the signal power are estimated for the N fingers independently of one another.

The in-slot interference-noise-power calculation circuits 106-1 to 106-N estimate the interference noise powers in the current slot. The in-slot interference noise power can be estimated as the dispersion from the average value of a fading envelope, with the pilot signal as a measurement interval, as described, for example, in the above-mentioned document 2. However, the process for estimating the in-slot interference noise power may use any technique. The current-slot interference noise powers 107-1 to 107-N are respectively input to the interference-noise-power inter-slot averaging circuits 108-1 to 108-N, and are simultaneously input to the switching circuit 112.

The in-slot interference-noise-power-output control circuit 115 receives the finger-state notification signals 114-1 to 114-N, and outputs the in-slot interference-noise-power-output control signal 116 including control information of each finger. The information of the finger-state notification signals 114-1 to 114-N includes, for example, valid and invalid flags, slot numbers, etc. of the fingers.

The in-slot interference-noise-power-output control circuit 115 outputs the in-slot interference-noise-power-output control signal 116 depending upon the finger-state notification signals 114-1 to 114-N. The in-slot interference-noise-power-output control signal 116 includes control information for controlling the switching circuit 112 of each finger, and is output only when the finger is valid.

As the in-slot interference-noise-power-output control signal 116, there are two types of signals including ON and OFF. The ON control signal is output only in the slot for the finger to first become valid therein after the radio link is established. The OFF control signal is output otherwise in the slot for the finger being valid therein.

Only as to the finger j (j is a natural number not larger than N) for which the in-slot interference-noise-power-output control signal 116 is ON, the switching circuit 112 outputs the current-slot interference noise power 107-j to the past-slot interference-noise-power memory 110.

The interference-noise-power inter-slot averaging circuits 108-1 to 108-N perform the inter-slot averaging processing between the interference noise powers 111-1 to 111-N stored in the past-slot interference-noise-power memory 110 and the current-slot interference noise powers 107-1 to 107-N. The inter-slot averaging processing is performed by an averaging method using a forgetting factor or a moving average technique.

In the method using the forgetting factor, an interference-noise-power average value NA is calculated as below, wherein $\lambda$ is the forgetting factor, PRINP is the current-slot interference noise power and PAINP is the past-slot interference noise power:

$$NA=(1-\lambda) \times PRINP + \lambda \times PAINP$$

The signal power is estimated by the signal-power calculation circuits 117-1 to 117-N, and is output to the SINR calculation circuit 119. As described, for example, in the above-mentioned document 1, the signal power in one slot is estimated by the square of the average value of the fading envelope, with the pilot signal used as the measurement interval, and further the averaging processing can be performed between the slots. However, the method for estimating may use any technique.

The SINR calculation circuit 119 estimates the signal-power-to-interference-noise-power ratios (SINR) 120-1 to 120-N for the respective fingers by using the input interference noise powers 109-1 to 109-N and the signal powers 118-1 to 118-N, and outputs the signal-power-to-interference-noise-power ratios 120-1 to 120-N to the maximum ratio combiner 121. The maximum ratio combiner 121 uses the SINRs 120-1 to 120-N for the respective fingers as weightings to perform maximum ratio combining of the demodulated signals, and outputs the combined signal 122 to the decoding unit 123.

Hereinafter, to describe the estimation of the interference noise power in more detail, a finger-n which is valid in the current slot will be discussed.

If the interference noise power has been estimated in one slot before by inter-slot averaging in the interference-noise-power inter-slot averaging circuit 108-n, then the inter-slot-averaged interference noise power of one slot before is stored in the past-slot interference-noise-power memory 110. In this case, the inter-slot averaging processing can be performed between the interference noise power in one slot before and in the current slot. The averaged result 109-n is output to the past-slot interference-noise-power memory 110 and the SINR calculation circuit 119.

Figure 5:
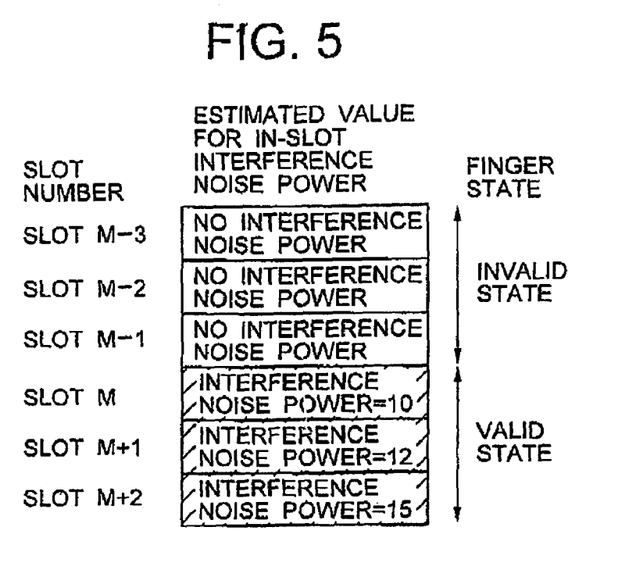
FIG. 5 is a diagram showing a first estimation example for an interference noise power.

On the other hand, if the inter-slot average value of the interference noise power has not been estimated before one slot, two cases are conceivable. One is the case immediately after the radio link is established and the past estimated value for the interference noise power does not exist. In this case, the current-slot interference noise power 107-n is stored in the past-slot interference-noise-power memory 110 by the switching circuit 112 as described above. In this case, the interference-noise-power inter-slot averaging circuits 108-n averages the current-slot interference noise powers with themselves. As a result, the current-slot interference noise power is output to the SINR calculation circuit 119. Such a case is shown in FIG. 5 showing the first estimation example of the interference noise power and its slot number corresponds to a slot M. In this case, the interference noise power estimated according to the present invention is the estimated value for the interference noise power 10 in the slot M.

In another case, the interference noise power has been estimated at least once in the past. The past-slot interference-noise-power memory 110 stores therein the estimated value for the interference noise power in the last slot where the finger n is valid before the current slot In this case, the interference-noise-power inter-slot averaging circuit 108-n slot performs the inter-slot averaging processing between the slot being valid lastly and the current slot interference noise power.

Figure 6:
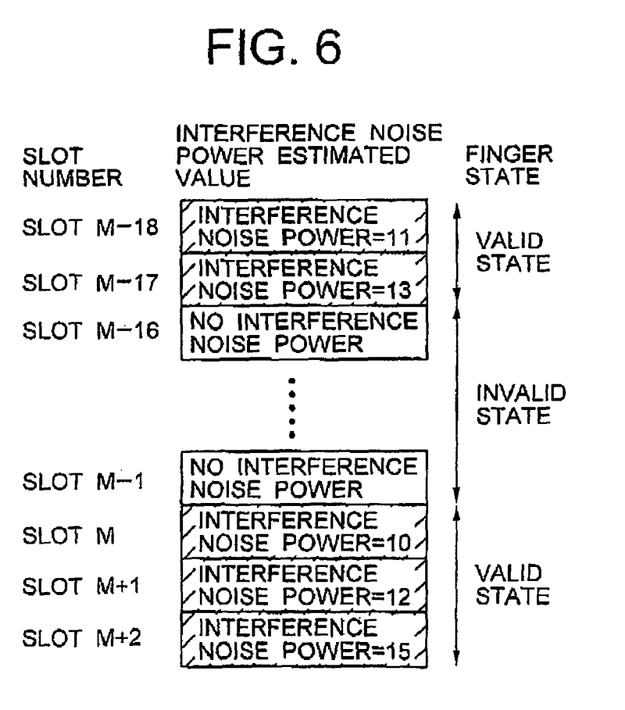
FIG. 6 is a diagram showing a second estimation example for an interference noise power.

Such a case is shown in FIG. 6 illustrating the second estimation example of the interference noise power, wherein the subject slot number corresponds to the slot M. In this case, the interference noise power estimated according to the present invention is an inter-slot average value between the estimated value for the interference noise power 10 in the slot M and the estimated value 13 in the slot M-17.

Figure 2:
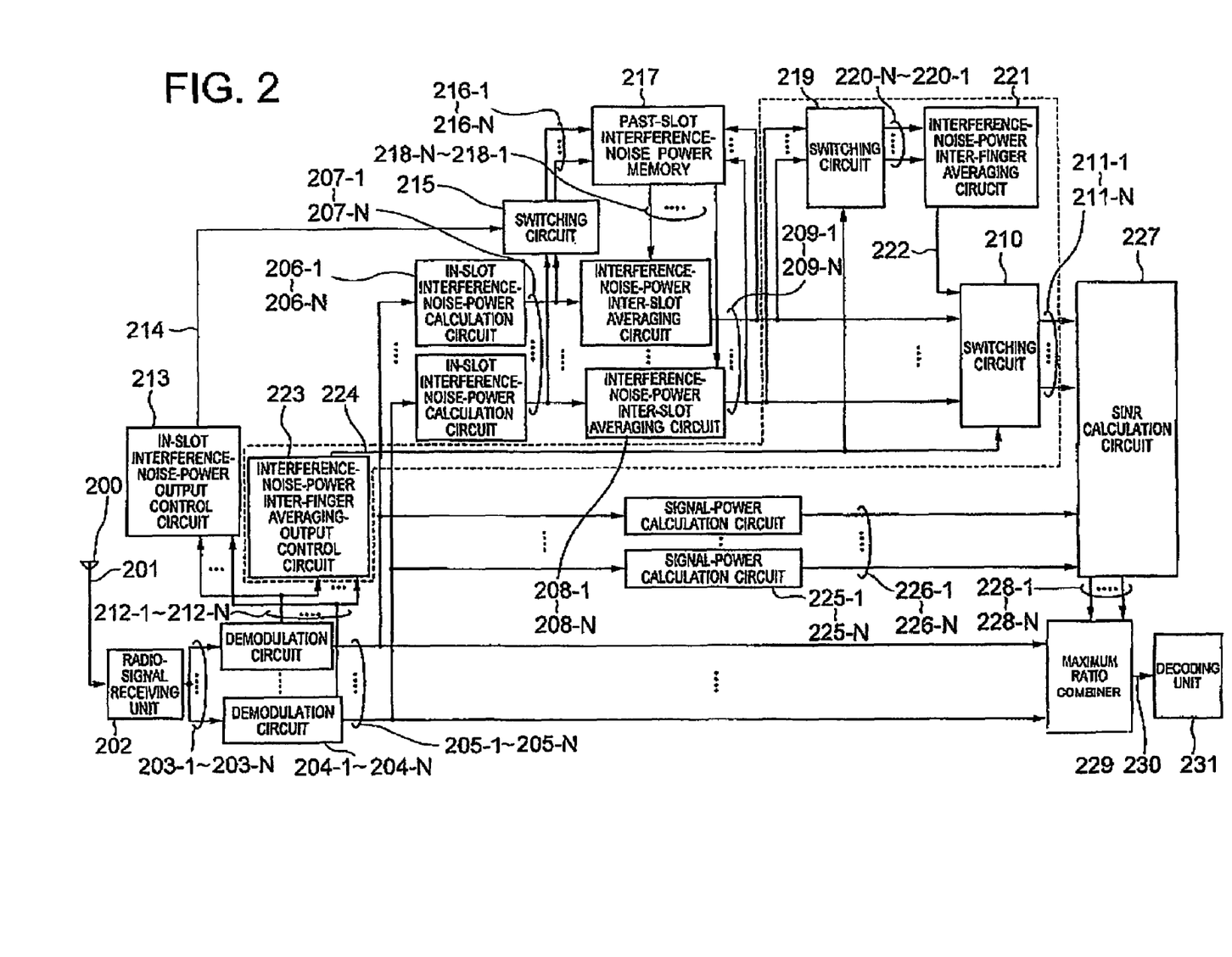
FIG. 2 is a block diagram of a CDMA receiving device according to a second embodiment of the present invention.

Referring to FIG. 2, a CDMA receiving device according to a second embodiment of the present invention is shown The second embodiment is different from the first embodiment shown in FIG. 1 in that a circuit for averaging an interference noise power among fingers is added. The other configuration is similar to that of the first embodiment.

The block for averaging an interference noise power among fingers includes an interference-noise-power inter-finger-averaging control circuit 223, a switching circuit 210, a switching circuit 219, and an interference-noise-power inter-finger averaging circuit 221.

In operation, the interference noise powers 209-1 to 209-N output by N interference-noise-power inter-slot averaging circuits 208-1 to 208-N are bi-split, and input to the switching circuit 210 and the switching circuit 219.

The interference-noise-power inter-finger-averaging control circuit 223 outputs an interference-noise-power inter-finger-averaging control signal 224, used for controlling to which finger the inter-finger averaging processing is performed, to the switching circuit 210 and the switching circuit 219 based on the finger-state notification signals 212-1 to 212-N input from the N demodulation circuits 204-1 to 204-N.

The interference-noise-power inter-finger-averaging control signal 224 includes control information of the fingers for controlling the switching circuit 210 and the switching circuit 219, and is output only when the finger is valid.

As the interference-noise-power inter-finger-averaging control signal 224, there are two yes of sign including ON and OFF. The ON control signal is output when the relevant finger is successively in a valid state for a given period of time, and the OFF control signal is output when the finger is valid except for the previous case. In this case, the valid state must continue long enough to allow the inter-slot averaging processing to be performed for the interference noise power.

A finger k for which the interference-noise-power inter-finger-averaging control signal 224 includes an ON, and a finger m (m is a natural number not larger than N) for which the control signal 224 includes an OFF will be discussed hereinafter. The switching circuit 219 outputs only an interference noise power 220-$k$ to the interference-noise-power inter-finger averaging circuit 221 based on the interference-noise-power inter-finger-averaging control signal 224.

The interference-noise-power inter-finger averaging circuit 221 estimates the inter-finger average 222 of the input interference noise power 220-$k$, and outputs the inter-finger average 222 to the switching circuit 210. The switching circuit 210 outputs the inter-slot average interference noise power 209-$k$ for the finger k, and outputs the inter-finger average interference noise power 222 for the finger m to the SINR calculation circuit 227. However, it is to be noted that if the control signals are OFF for all the fingers, the interference noise powers 209-1 to 209-N are output to the SINR calculation circuit 227.

Figure 7:
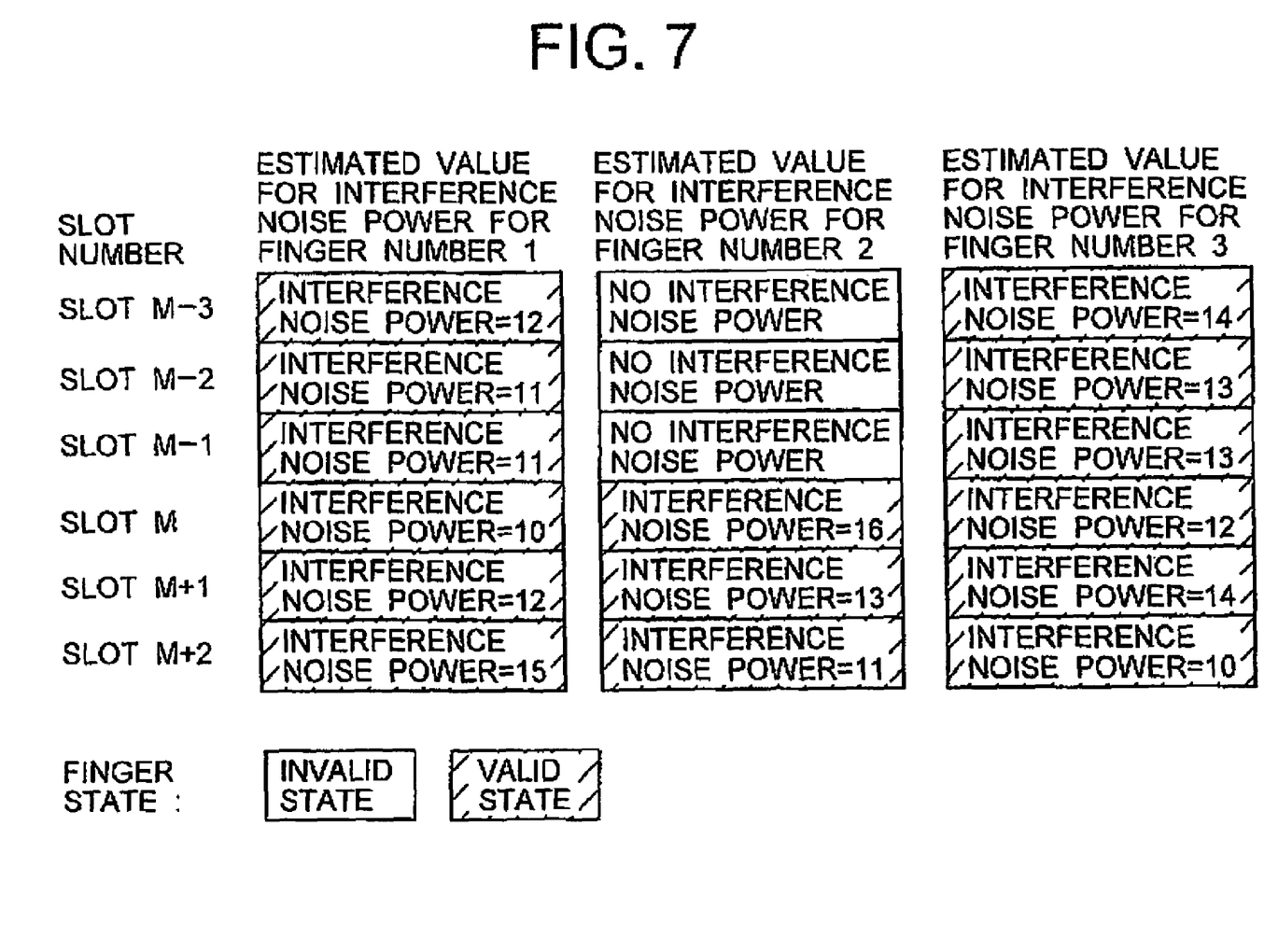
FIG. 7 is a diagram showing a third estimation example for an interference noise power.

Hereinafter, in order to describe the operation of this embodiment in more detail, estimation of the interference noise power in the slot M in the example shown by a third estimation example of the interference noise power of FIG. 7 is discussed. In this case, the interference-noise-power inter-finger-averaging control signal 224 is ON for finger numbers 1 and 3, and is OFF for a finger number 2.

Therefore, the interference noise power 211-2 output from the switching circuit 210 is an inter-finger average, 11, of 10 and 12 which are the estimated values for the interference noise powers of the finger numbers 1 and 3 in the slot M. On the other hand, the interference noise powers 211-1 and 211-3 are 10 and 12, respectively.

According to a second embodiment, even if there is a finger for which the estimated value for the interference noise power does not exist in one slot before, the optimum maximum ratio combining can be performed. This is because the estimation accuracy of the interference noise power is improved by adding the configuration for inter-finger averaging the interference noise powers of the fingers for which the inter-slot averaging processing is sufficiently performed.

Figure 3:
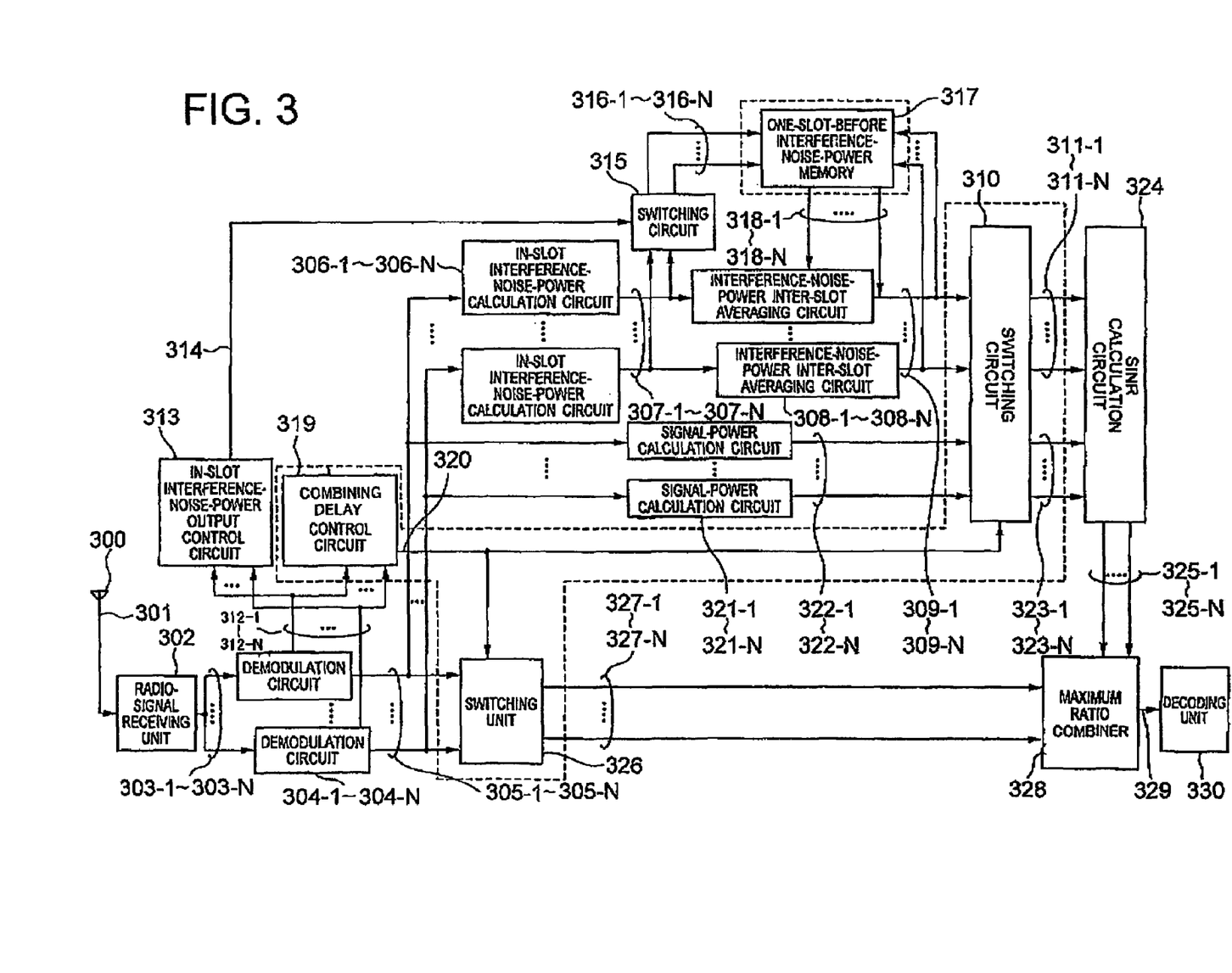
FIG. 3 is a block diagram of a CDMA receiving device according to a third embodiment of the present invention.

Referring to FIG. 3, a CDMA receiving device according to a third embodiment of the present invention is shown. The third embodiment is different from the first embodiment in that a circuit is added in the present embodiment, the circuit using a demodulated signal in the maximum ratio combining after inter-slot averaging processing of an interference noise power is performed for a given period of time, if there is no estimated value for the interference noise power of one slot before.

The added configuration includes a combining-delay control circuit 319, a switching circuit 310, and a switching circuit 326. The past-slot interference-noise-power memory 110 is replaced by a one-slot-before interference-noise-power memory 317.

In this third embodiment, it is not necessary to perform the inter-slot averaging processing by using the past-estimated value unlike the first embodiment. This is because the interference noise power is sufficiently averaged among the slots and is utilized for the maximum ratio combining if there is no estimated value for the interference noise power of one slot before.

In operation, interference noise powers 309-1 to 309-N output by N interference-noise-power inter-slot averaging circuits 308-1 to 308-N are input to the switching circuit 310. The demodulated signals 305-1 to 305-N output by N demodulation circuits 304-1 to 304-N are input to the switching circuit 326.

The combining-delay control circuit 319 outputs a combining-delay control signal 320 to the switching circuit 310 and the switching circuit 326, for controlling which finger is to be used for the maximum ratio combining based on the finger-state notification signals 312-1 to 312-N input from the demodulation circuits 304-1 to 304-N.

The combining-delay control signal 320 includes control information of each finger for controlling the switching circuit 310 and the switching circuit 326, and outputs only if the relevant finger is valid. As the combining-delay control signal 320, there are two types of signals including ON and OFF. The OFF control signal is output until the valid state continues for a given period of time if the finger that was in an invalid state one slot before becomes valid in the current slot.

The ON control signal is output after the valid state of the finger is continued for a given period of time. The ON control signal is successively output unless the relevant finger becomes invalid. In this case, the valid state must continue long enough to allow the inter-slot averaging processing for the interference noise power to be sufficiently performed.

Here, a certain finger n will be discussed. When the OFF combining-delay control signal 320 is input to the switching circuit 310, the switching circuit 310 does not output the interference noise power 311-$n$ and the signal power 323-$n$ to the SINR calculation circuit 324. However, since the interference noise power is input to the one-slot-before interference-noise-power memory 317 and stored therein, the interference noise power can be used for the inter-slot averaging processing of the interference noise power in the next slot.

Similarly, if the OFF control signal 320 is input to the switching circuit 326, the switching circuit 326 does not output the demodulated signal 305-$n$ to a maximum ratio combiner 328. Therefore, the finger n is used only for estimating the interference noise power and the signal power while the combining-delay control signal 320 is OFF. At the time when the combining-delay control signal 320 is changed from OFF to ON, the switching circuit 310 outputs the interference noise power 311-$n$ and the signal power 323-$n$ to the SINR calculation circuit 324, wherein the SINR estimating for the relevant finger is started. Simultaneously, the switching circuit 326 outputs the demodulated signal 327-$n$ to the maximum ratio combiner 328, and performs the maximum ratio combining to the demodulated signal based on the estimated SINR 325-$n$.

According to the third embodiment, even if there is a finger for which the estimated value for the interference noise power does not exist in one slot before, the optimum maximum ratio combining can be performed. The reason is that the accurate interference noise power can be used at any time for the maximum ratio combining by adding the configuration for not performing the maximum ratio combining for the finger until the interference noise power is sufficiently averaged among the slots.

Figure 4:
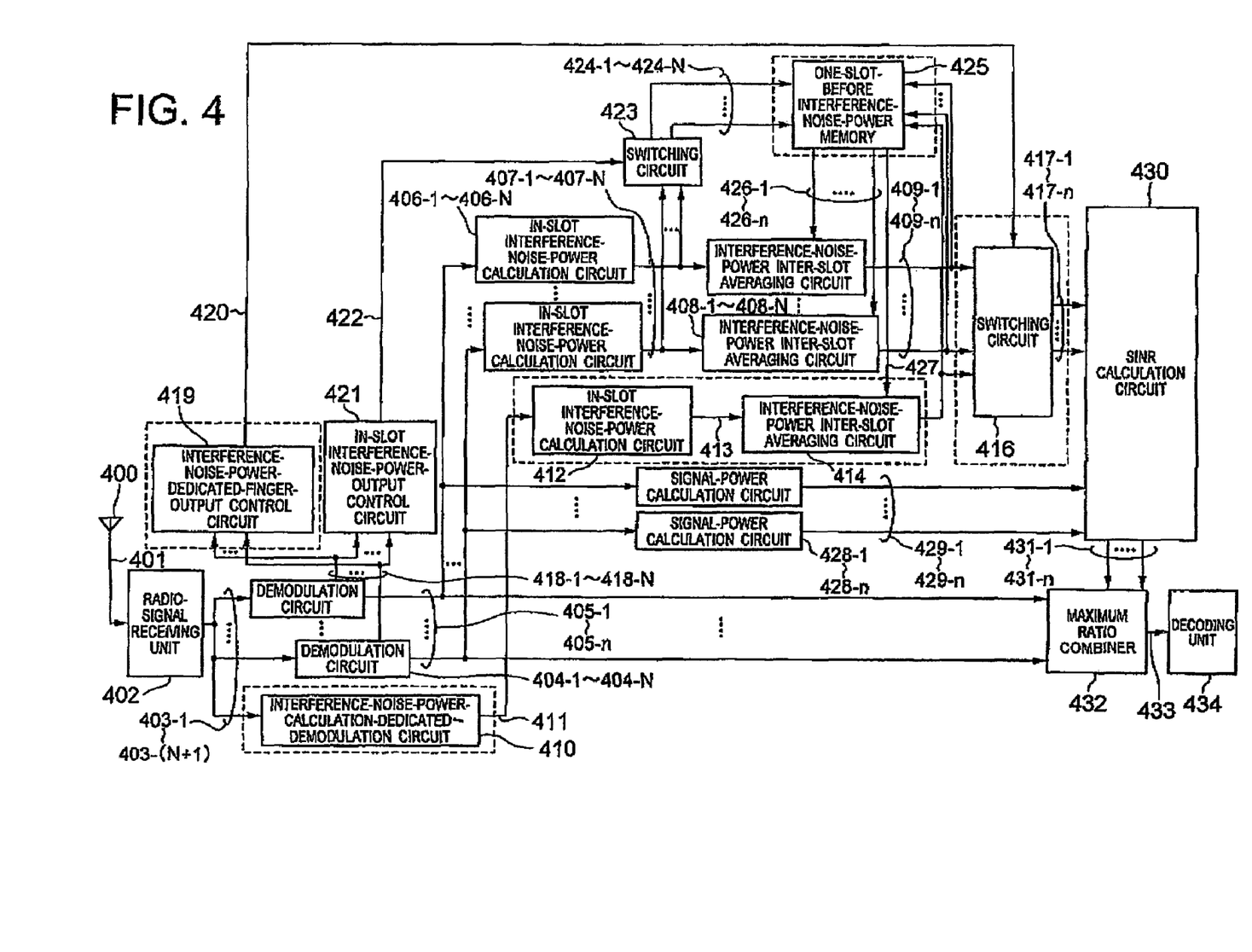
FIG. 4 is a block diagram of a CDMA receiving device according to a fourth embodiment of the present invention.

Referring to FIG. 4, a CDMA receiving device according to a fourth embodiment of the present invention is shown. The fourth embodiment is different from the first embodiment in that a finger dedicated to the interference noise power calculation is provided.

A portion for estimating the interference noise power by using the finger dedicated to calculating the interference noise power includes an interference-noise-power-calculation-dedicated-finger-output control circuit 419, a switching circuit 416, an interference-noise-power-calculation-dedicated-demodulation circuit 410, an in-slot interference-noise-power calculation circuit 412, and an interference-noise-power inter-slot averaging circuit 414.

Further, the past-slot interference-noise-power memory 110 is replaced by a one-slot-before interference-noise-power memory 425. This is because an accurate interference noise power, which is estimated by the interference-noise-power-calculation-dedicated finger, can be used for the SINR estimation when there is no interference noise power of one slot before, without performing the inter-slot averaging using the interference noise power of the past-slot, unlike the first embodiment.

In operation, the baseband signal output by the radio-signal receiving unit 402 is distributed to (N+1). This is because the baseband signal is distributed to the interference-noise-power-calculation-dedicated finger in addition to N fingers for demodulating the received signal. The baseband signals 403-1 to 403-(N+1) are input to N demodulation circuits 404-1 to 404-N and the interference-noise-power-calculation-dedicated demodulation circuit 410.

The interference-noise-power-calculation-dedicated demodulation circuit 410 performs despread demodulation for the baseband signal 403-(N+1) based on an arbitrary synchronization timing determined for this purpose. Therefore, in the interference-noise-power-calculation-dedicated finger, there occurs no case where the demodulation is not performed due to the reason that the synchronization timing cannot be detected, and thus stays in the valid state at any time.

Accordingly, the interference noise power estimated by the interference-noise-power-calculation-dedicated finger is accurately estimated due to the inter-slot averaging performed at any time. The in-slot interference-noise-power calculation circuit 412 estimates the interference noise power in the current slot from the demodulated signal 411 demodulated by the interference-noise-power-calculation-dedicated demodulation circuit 410, and the inter-slot averaging processing of the interference noise power is performed by the interference noise power averaging circuit 414. An interference-noise-power inter-slot average value 415 is stored in the one-slot-before interference-noise-power memory 425 similarly to the interference noise power estimation processing for the fingers except the interference-noise-power calculation-dedicated finger, and is used for the inter-slot averaging processing in the next slot.

An interference-noise-power calculation-dedicated-finger-output control circuit 419 outputs an interference-noise-power-calculation-dedicated-finger-output control signal 420, which is used for controlling for which finger the SINR estimation is performed by using the interference noise power estimated by the interference-noise-power-calculation-dedicated finger based on the finger-state notification signals 418-1 to 481-N input from the N demodulation circuits 404-1 to 404-N, to the switching circuit 416.

The interference-noise-power-calculation-dedicated-finger-output control signal 420 includes control information of each finger for controlling the switching circuit 416, and outputs only when the relevant finger is valid. The interference-noise-power-calculation-dedicated-finger-output control signal 420 includes two types of signals including ON and OFF. The ON control signal is output if the finger is successively in a valid state for a given period of time, and the OFF control signal is output when the finger is valid except for the previous case. In this case, the valid state must continue long enough to allow the inter-slot averaging processing to be performed for the interference noise power.

Hereinafter, a finger k for which the interference-noise-power-calculation-dedicated-finger-output control signal 420 includes an ON, and a finger m for which the control signal 420 includes an OFF will be discussed. The switching circuit 416 outputs an interference noise power 415 estimated by the interference-noise-power-calculation-dedicated finger to an SINR calculation circuit 430 for an interference noise power 471-*m*. On the other hand, as to the interference noise power 417*k*, an interference noise power 409-*k*, which is inter-slot averaged by a finger k, is output to the SINR calculation circuit 430.

According to a fourth embodiment, even if there is a finger for which the estimated value for the interference noise power does not exist in one slot before, the optimum maximum ratio combining can be performed. The reason is that the estimation accuracy of the interference noise power is improved by adding the configuration for performing the inter-slot averaging processing at any time in the interference-noise-power calculation-dedicated finger.

As described above, the CDMA receiving device according to the present invention can prevent the deterioration of receiving quality by accurately estimating the interference noise power even if there is no estimated value for the interference noise power of one slot before.

According to the present invention, even if there is no estimated value for the interference noise power of one slot before, such as, immediately after the radio link is established, or in the case where the finger is again validated after the finger is once invalidated, the optimum maximum ratio combining can be performed. The reason is that the estimation accuracy of the interference noise power is improved by adding the configuration for storing at any time the interference noise power, which is an object for performing the inter-slot averaging processing, in the past-slot interference-noise-power memory 110.

The invention claimed is:

1. A CDMA receiving device for estimating a signal power and an interference noise power of a received signal for each of a plurality of fingers, and combining a demodulated signal by using a signal-power-to-interference-noise-power ratio estimated from the estimated signal power and interference noise power of each of the plurality of fingers, characterized by:

interference-noise-power calculation means (106, 206, 306, 406) for estimating an interference noise power for each of the plurality of fingers during a current slot;

storage means (110, 217, 317, 425) for storing therein an estimated value for the interference noise power estimated for each of the plurality of fingers during a last valid slot before the current slot;

first averaging means (108, 208, 308, 408) for averaging, for each of the plurality of fingers, the interference noise power estimated during the current slot by said interference-noise-power calculation means for a finger (106, 206, 306, 406) and the estimated value for the interference noise power stored in said storage means (110, 217, 317, 425) during the last valid slot before the current slot for the finger to generate an averaged estimated value for the interference noise power;

first judging means (115, 213, 313, 421) for judging when each of the plurality fingers encounters a valid slot after a radio link is established; and first switching means (112, 215, 315, 423) for coupling said interference noise power calculation means (106, 206, 306, 406) to said storage means (110, 217, 317, 425) based on a judged result by said first judging means (115, 213, 313, 421).

2. The CDMA receiving device according to claim 1, wherein said first switching means (112, 215, 315, 423) stores the estimated value for the interference noise power estimated in the current slot by the interference noise power calculation means for each one of the plurality of fingers (106, 206 306, 406) into said storage means (110, 217, 317, 425) if said one of the plurality of fingers is first judged to be valid after the radio link is established by said first judging means (115, 213, 313, 421).

3. The CDMA receiving device according to claim 1 or 2 further comprising:

second judging means (223) for judging whether or not each of the plurality of fingers are successively in a valid state for a given period of time;

second averaging means (221) for averaging the estimated values for the interference noise power among the plurality of fingers;

second switching means (219) for allowing said second averaging means (221) to average the average estimated value for the interference noise power, which is averaged by said first averaging means (208), based on a judged result by said second judging means (223); and third switching means (210) for outputting either one of an averaged result by said first averaging means (208) and an averaged result by said second averaging means based on a judged result by said second judging means (223).

4. The CDMA receiving device according to claim 3, wherein:

said second switching means (219) allows said second average means (221) to use the estimated value for the interference noise power among the plurality of fingers, if said plurality of fingers are judged to be successively valid for a given period of time by said second judging means (223); and said third switching means (210) outputs an averaged result by said second averaging means (221) instead of said estimated value for the interference noise power for a one of said plurality of fingers if said one of said plurality of fingers is judged to be valid though not continually valid for a given period of time by said second judging means (223).

5. The CDMA receiving device according to claim 1 or 2, wherein said storage means (317) stores only the estimated value for the interference noise power of the last valid slot for each of the plurality of fingers, said CDMA receiving device further comprising:

second judging means (319) for judging whether or not each of the plurality of fingers is successively in a valid state for a given period of time; and second switching means (310) for switching whether or not the average estimated value for the interference noise power averaged for each of the plurality of fingers by said first averaging means (308) is output based on a judged result by said second judging means (319).

6. The CDMA receiving device according to claim 5, further comprising:

signal-power-to-interference-noise-power ratio calculation means (324) for calculating a signal-power-to-interference-noise-power ratio based on an output of said second switching means (310), and a demodulated-signal combining means (328) for combining the demodulated signal based on a calculated result by said signal-power-to-interference-noise-power ratio calculation means (324); and third switching means (326) for outputting the demodulated signal to said demodulated-signal combining means (328) based on the judged result by said second judging means (319).

7. The COMA receiving device according to claim 6, wherein:

said second switching means (310) outputs an output of said first averaging means (308) for each of said plurality of fingers judged to be successively valid for a given period of time by said second judging means (319), and does not output the average estimated value for the interference noise power averaged by said first averaging means (308), for each of said plurality of fingers judged not to be successively valid for a given period of time by said second judging means (319); and said third switching means (326) outputs said demodulated signal to said demodulated-signal combining means (328), for each of said plurality of fingers judged to be successively valid for a given period of time by said second judging means (319), and does not output the demodulated signal to said demodulated-signal combining means (328), for each of said plurality of fingers judged not to be successively valid for a given period of time by said second judging means (319).

8. The CDMA receiving device according to claim 1 or 2, wherein said storage means (425) stores therein only the estimated value for the interference noise power of the last valid slot for each of the plurality of fingers, said CDMA receiving device further comprising:

interference-noise-power-calculation-dedicated demodulation means (410) for demodulating the received signal by using an arbitrary synchronization timing, second interference-noise-power calculation means (412) for estimating the interference noise power in said current slot for said demodulated signal demodulated by said interference-noise-power-calculation-dedicated demodulation means (410), second averaging means (414) for averaging an interference noise power in said current slot estimated by said second interference noise power calculation means (412) and the estimated value for the interference noise power stored in said storage means (425); and second judging means (419) for judging whether or not said plurality of finger are successively in a valid state for a given period of time, and second switching means (416) for outputting either one of an averaged result by said first averaging means (408) and an averaged result by said second averaging means (414) based on the judged result by said second judging means (419).

9. The COMA receiving device according to claim 8, wherein said second switching means (416) outputs an output for each of said first averaging means (408), for each corresponding finger judged to be successively valid for a given period of time by said second judging means (419), and outputs an output of said second averaging means (414), if said finger is judged not to be successively valid for a given period of time by said second judging means (419).

* * * * *